(12) United States Patent
Venables

(10) Patent No.: US 11,666,180 B2
(45) Date of Patent: *Jun. 6, 2023

(54) PEANUT BUTTER MIXER SYSTEM AND METHOD

(71) Applicant: Stacey Venables, North Vancouver (CA)

(72) Inventor: Stacey Venables, North Vancouver (CA)

(*) Notice: Subject to any disclaimer, the term of this patent is extended or adjusted under 35 U.S.C. 154(b) by 513 days.

This patent is subject to a terminal disclaimer.

(21) Appl. No.: 17/009,239

(22) Filed: Sep. 1, 2020

(65) Prior Publication Data

US 2020/0397187 A1   Dec. 24, 2020

Related U.S. Application Data

(63) Continuation-in-part of application No. 16/103,728, filed on Aug. 14, 2018, now Pat. No. 10,792,629.

(51) Int. Cl.
| | |
|---|---|
| *A47J 43/00* | (2006.01) |
| *A47J 43/044* | (2006.01) |
| *A47J 43/07* | (2006.01) |
| *B01F 27/172* | (2022.01) |
| *B01F 27/1142* | (2022.01) |
| *B01F 33/501* | (2022.01) |
| *B01F 35/32* | (2022.01) |
| *B01F 101/06* | (2022.01) |

(52) U.S. Cl.
CPC ......... *A47J 43/044* (2013.01); *A47J 43/0711* (2013.01); *B01F 27/1142* (2022.01); *B01F 27/172* (2022.01); *B01F 33/5011* (2022.01); *B01F 35/3204* (2022.01); *A47J 2043/04427* (2013.01); *B01F 2101/06* (2022.01)

(58) Field of Classification Search
CPC .................. A47J 43/044; A47J 43/0711; A47J 2043/04427; B01F 33/5011; B01F 27/172; B01F 27/1142; B01F 35/3204; B01F 2101/06

See application file for complete search history.

(56) References Cited

U.S. PATENT DOCUMENTS 10,792,629 B2 * 10/2020 Venables ............... B01F 27/213

* cited by examiner

*Primary Examiner* — Anshu Bhatia
(74) *Attorney, Agent, or Firm* — David W Barman

(57) ABSTRACT

A peanut butter mixer system including: a screw-mixer formed as a continuous rod member having sequential looped coils along a length of said continuous rod member and terminating with a cutting edge; wherein said screw-mixer is powered via a motor and a power source as manipulated by a user-operator to re-mix peanut butter in a provided container. The screw-mixer is powered via the motor and power source as manipulated by a user-operator.

4 Claims, 6 Drawing Sheets

PEANUT BUTTER MIXER SYSTEM AND METHOD

INDEX TO RELATED APPLICATIONS

This application is a continuation-in-part of U.S. patent application Ser. No. 16/103,728 filed Aug. 14, 2018 the disclosure of which is incorporated herein by reference in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of food or edible material: process, compositions, and products, and agitation, of existing art and more specifically relates to food or edible material: process, compositions, and products, and agitation, including mixing or agitating, e.g., homogenizing, etc., and a single stirrer.

Many adults and children enjoy the taste of peanut butter. Natural peanut butter when stored for a duration may separate out into its constituent ingredients (e.g. oil and solids), requiring re-mixing to be palatable and consumable. Standard kitchen appliances do not allow peanut butter lovers to re-mix peanut butter effectively and are often too heavy and/or bulky to use effectively or do not fit within the existing peanut butter container. The ability to thoroughly mix peanut butter at home allows the consumer convenience and enables more complete usage of the peanut butter. A suitable solution is desired.

U.S. Pub. No. 2015/0196881 to Robin R. Rabii relates to a top (manual) stirring implement for natural peanut butter. The described top stirring implement for natural peanut butter includes a lid-mounted stirring implement providing an external crank handle which drives the rotation of a central internal pin, which supports one or more distal stirring elements. By turning the handle, the user may stir and temporarily homogenize the nut butter or other contained product, while keeping the container sealed and unable to leak.

SUMMARY OF THE INVENTION

In view of the foregoing disadvantages inherent in the known food or edible material: process, compositions, and products, and agitation art, the present disclosure provides a novel peanut butter mixer system. The general purpose of the present disclosure, which will be described subsequently in greater detail, is to provide a peanut butter mixer such that users can re-mix peanut butter at home necessary for consumption.

A peanut butter mixer system in a preferred embodiment is disclosed herein comprising: a screw-mixer formed as a continuous rod member having sequential looped coils along a length of the continuous rod member and terminating with a cutting edge; wherein the screw-mixer is powered via a motor and a powerer as manipulated by a user-operator to re-mix peanut butter in a provided container (which the peanut butter was sold in or the like).

In alternate embodiments a peanut butter mixer system assembly is disclosed herein comprising a container; a screw-mixer; a motor; and a powerer. The peanut butter mixer system comprises a peanut butter mixer assembly; wherein the peanut butter mixer assembly comprises in function combination the container, the screw-mixer, the motor, and the powerer. The screw-mixer is powered via the motor and powerer as manipulated by a user-operator. A method of use for a peanut butter mixer system is also disclosed herein comprising the steps of: providing a peanut butter mixer system comprising: a peanut butter mixer assembly including: a screw-mixer; a motor; and a powerer; and introducing the screw mixer into a peanut butter container; and mixing the natural peanut butter inserting the screw mixer to the container.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a peanut butter mixer, constructed and operative according to the teachings of the present disclosure.

The various embodiments of the present invention will hereinafter be described in conjunction with the appended drawings, wherein like designations denote like elements.

DETAILED DESCRIPTION OF THE PREFERRED EMBODIMENTS OF THE INVENTION

Figure 3:
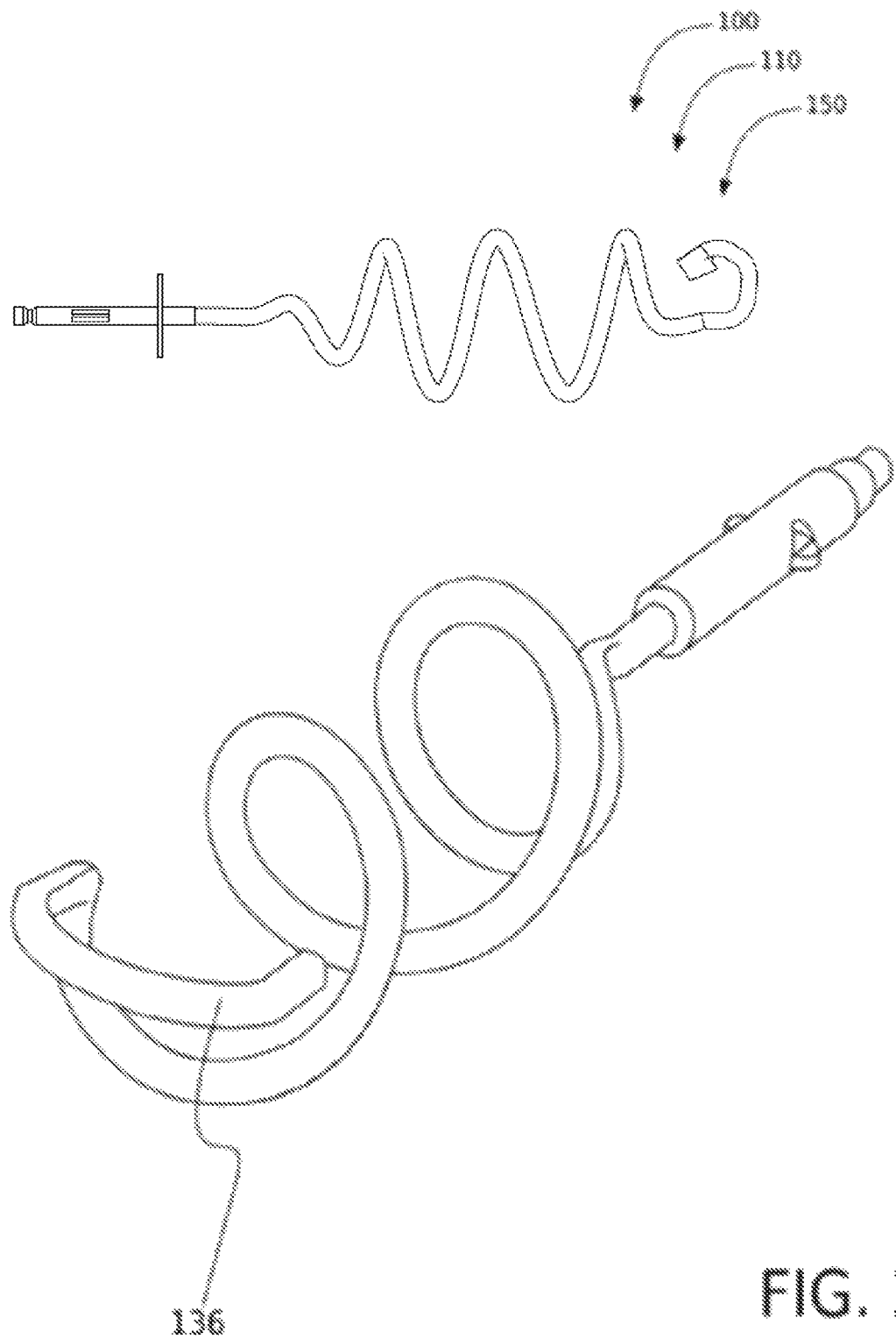
FIG. 3 is a perspective view of the peanut butter mixer of FIG. 1, according to an embodiment of the present disclosure.

As discussed above, embodiments of the present disclosure relate to a food or edible material: process, compositions, and products, and agitation, including mixing or agitating, e.g., homogenizing, etc., and single stirrer and more particularly to a peanut butter mixer as used to improve the process of mixing natural peanut butter at home. Generally speaking, the peanut butter mixer system of the present invention in a preferred embodiment comprises: a screw-mixer formed as a continuous rod member having sequential looped coils along a length of the continuous rod member and terminating with a cutting edge; wherein the screw-mixer is powered via a motor and a powerer as manipulated by a user-operator to re-mix natural peanut butter in a provided container preferably the original container. The provided container may be plastic, glass or the like; wherein the provided container when coupled to the screw-mixer provides means for agitating contents within the provided container. The provided container may comprise a recessed well bottom and a top well opening or other shape. The provided container is remote to said screw-mixer. Referring now to the sequential looped coils; the sequential looped coils may comprise exactly three of the sequential looped coils, as shown in FIG. 3 or other versions with more or less looped coils may be used. The sequential looped coils provide rotating and agitation functionality of the screw-mixer so as to be able to 'fold' (re-mix) the peanut butter. The cutting edge comprises a spaded-ramp; wherein the spaded-ramp has an incline with a hook (curved edge scoop) at an end of the incline. The screw-mixer preferably comprises a terminal U-hook (slightly off of a U-shape and slightly off of a V-shape); wherein the screw-mixer comprises a cylindrical profile about a length of the continuous rod member. The screw-mixer comprises a lower rod portion running substantially parallel to the provided container during use and the screw-mixer comprises engaging and locking mechanism for coupling to the motor. The present invention: 1) Prevents waste of hard peanut residue at bottom of jar with existing poor mixing methods; 2) Improves taste-crushed peanuts to oil ratio perfect from top to bottom of jar.

Figure 1:
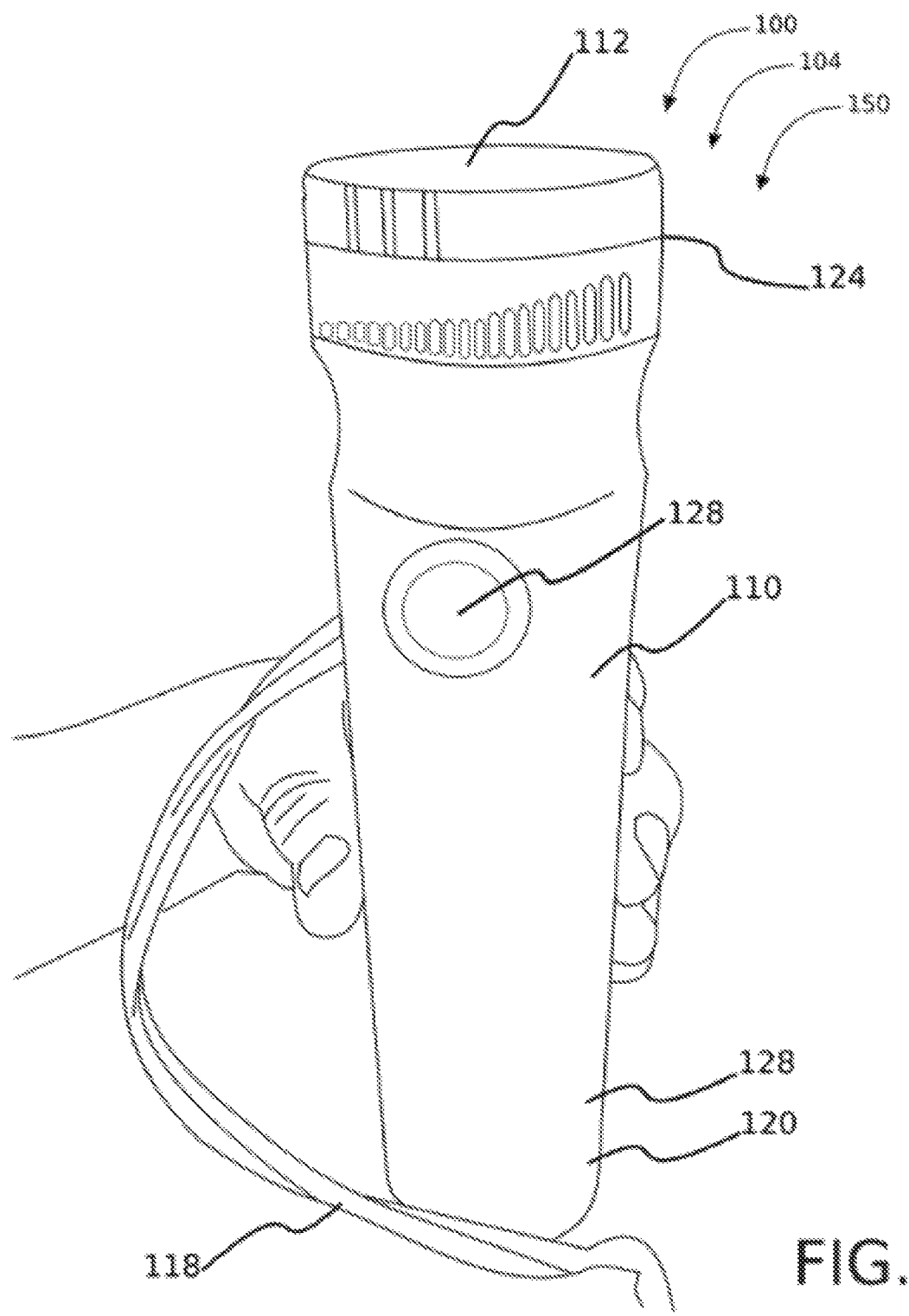
FIG. 1 is a perspective view of the peanut butter mixer during an 'in-use' condition, according to an embodiment of the disclosure.
Figure 2:
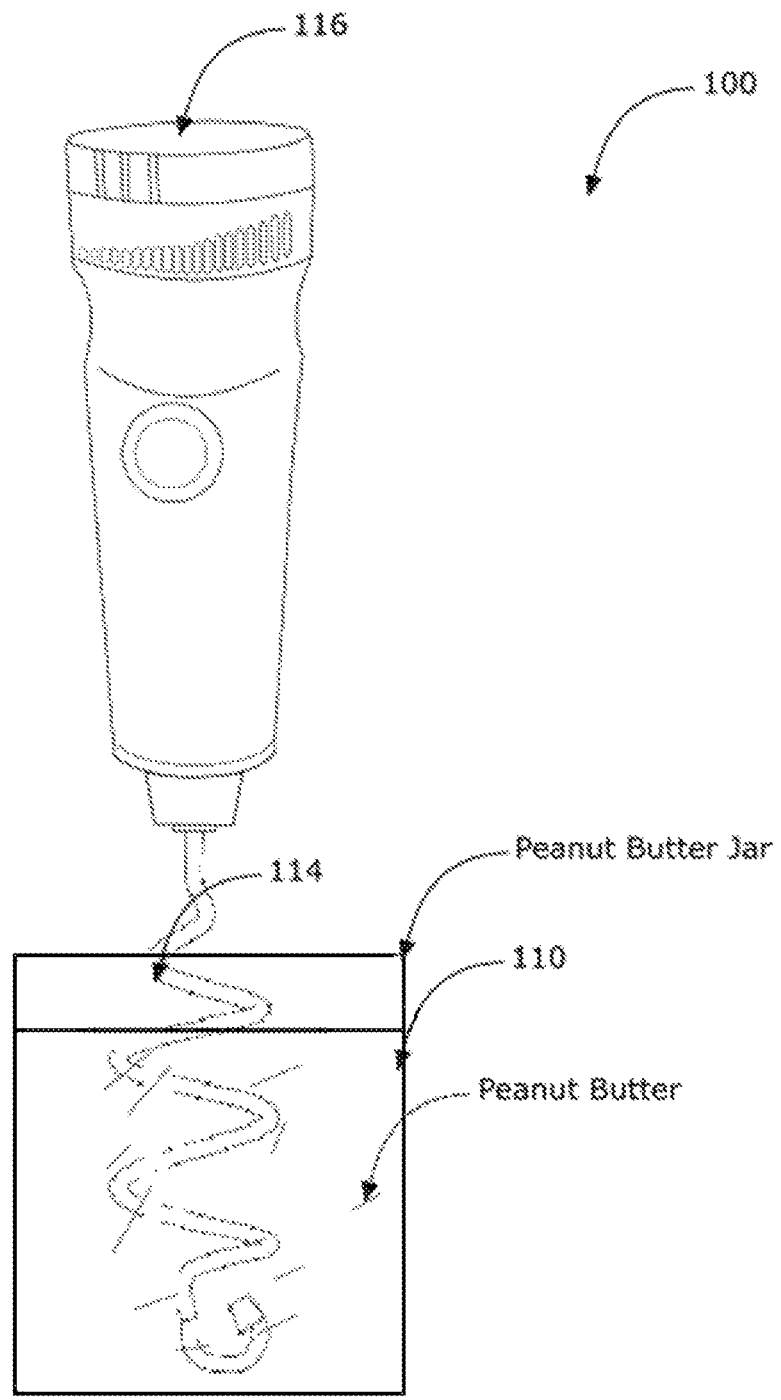
FIG. 2 is a perspective view of the peanut butter mixer of FIG. 1, according to an embodiment of the present disclosure.

Referring now more specifically to the drawings by numerals of reference, there is shown in FIGS. 1-3, various views of a peanut butter mixer system 100.

FIG. 1 shows a peanut butter mixer system 100, according to an embodiment of the present disclosure. Here, the peanut butter mixer system 100 may be beneficial for use by a user to improve the process of mixing peanut butter at home. As illustrated, the peanut butter mixer system 100 may include in alternate embodiments a peanut butter mixer assembly 104 including: a container 110; a screw-mixer 114; a motor 116; and a powerer 118. Powerer 118 may comprise batteries or a cord to plug in to an ac outlet. The peanut butter mixer system 100 comprises peanut butter mixer assembly 104. The screw-mixer 114 is powered by a motor 116 and powerer 118 as manipulated by a user-operator. Container 110 is preferably the original container for the natural peanut butter, but may alternatively be a dedicated container for use with the mixer system 100.

Referring now to FIGS. 2-3 showing varies views of the peanut butter mixer system 100 of FIG. 1, according to an embodiment of the present disclosure.

As illustrated, the peanut butter mixer system 100 may comprise a mixing container 110 body and provides means for agitating natural peanut butter within the container 110, with the preferred container being the provided container that the natural peanut butter was purchased in. The container 110 may comprise a recessed well bottom 122 and increases in diameter to a top well opening 124. Additionally, the peanut butter mixer system may comprise screw-mixer 114 in combination with motor 116 and powered 118 for insertion inside container 110 or within the provided container to mix peanut butter.

Figure 5:
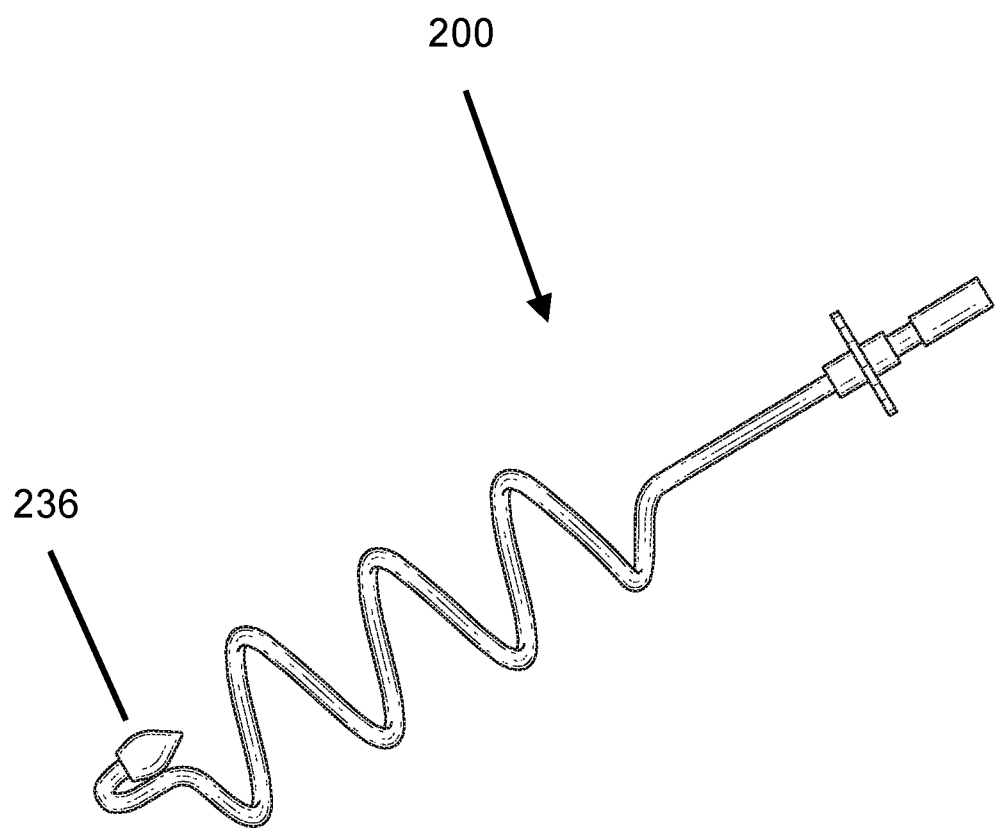
FIG. 5 is a side perspective view of the peanut butter mixer according to an embodiment of the present disclosure.
Figure 6:
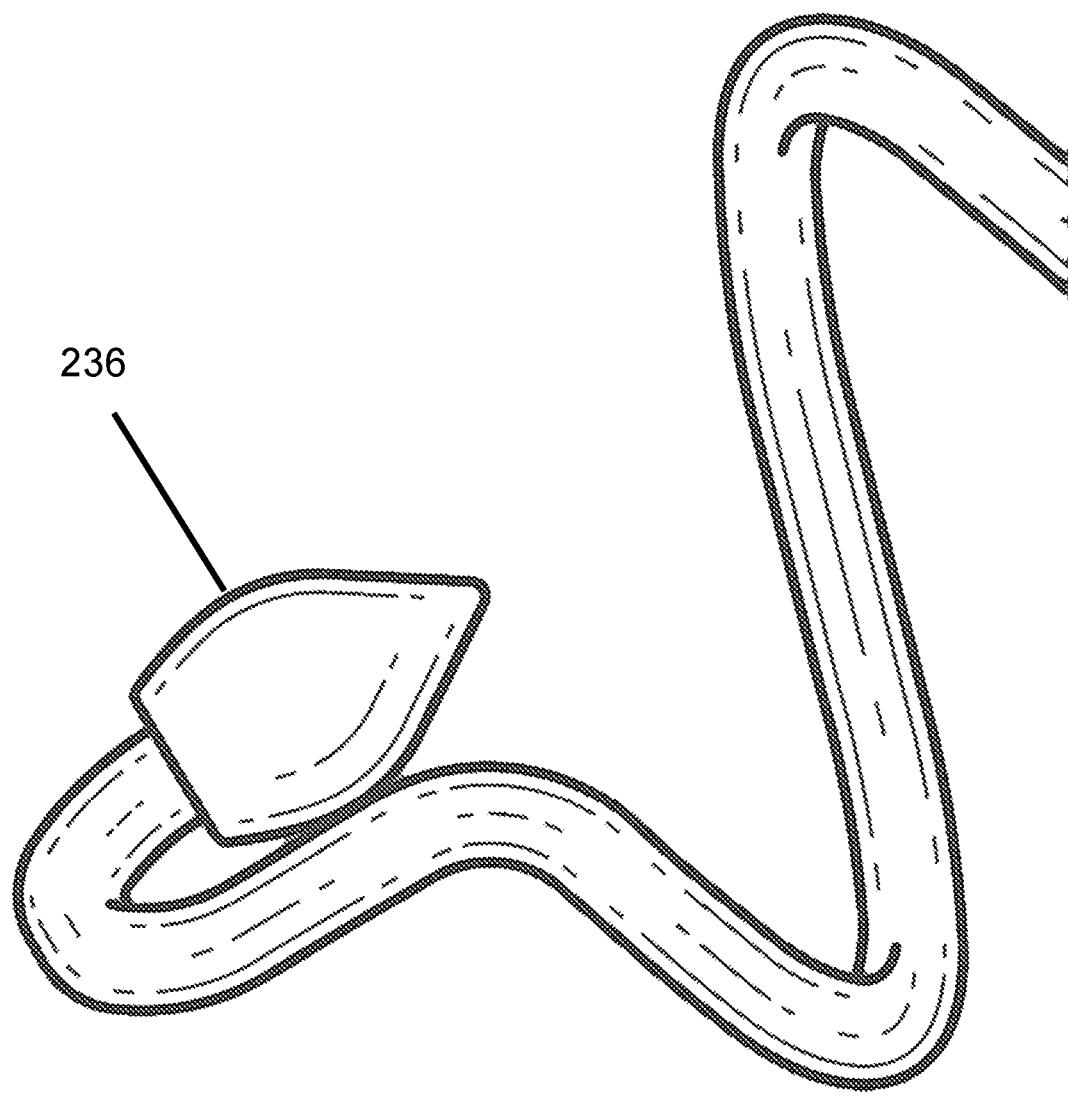
FIG. 6 is a a side perspective view close view of the tip from FIG. 5

The peanut butter mixer system screw-mixer 114 contains a lower rod 130 extending through a hole to the motor 116 for providing rotating and agitation functionality and screw-mixer 114 is positioned within container 110 a tolerance-distance from inner sidewalls 134 of container 110 such that the contents natural peanut butter does not hang up on the inner sidewalk and to effectively ensure thorough mixing of the peanut butter. Additionally, the dimensions of screw mixer 114 are such that oil displacement from insertion is minimized. The screw-mixer 114 comprises a terminal U-hook 136. Additionally, screw-mixer 114 comprises a cylindrical profile about a length of a screw-driver 138. Certain embodiments may comprise a screw-mixer 114 without a terminal U-hook 136, but rather a V-shaped terminal end (as a terminal-hook also shown in FIG. 3) with a cutting edge for slicing through the ingredients. Preferred dimensions of this embodiment comprise about 145 mm overall length by about 40 mm cylindrical diameter (width) with a shaft width of about 3.5-4.0 mm and encompassing at least three full helical curves. A smaller or larger version may be scaled according for use with smaller/larger jars/containers. In the embodiment demonstrated in FIGS. 5 and 6, peanut butter mixer assembly 200 is configured with a filleted arrow tip 236. In a preferred embodiment, the looped coils are 1.25 inches at max width, resulting in mixing that is improved in preventing hard nut butter settling inside the loops.

Stainless steel extrusion from 4 mm to 2 mm wide reducing mixing area in jars preventing displacement and overflow of surface nut butter oil. Another design benefit with 2 mm extrusion is less drag/resistance on motor. More efficient mixing.

The filleted arrow tip imparts better agitation of settled nuts improving mixing time by minimum 50%.

As illustrated, the peanut butter mixer system pressure switch 128 in alternate embodiments is preferably mounted on powered 118 or motor 116 for activating motor 116 allowing agitation of natural peanut butter. The screw-mixer 114 comprises a lower rod 130 portion running parallel to container 110 during use, and mates with motor 116 via threads and a similar locking mechanism. Additionally, the peanut butter mixer system screw-mixer 114 may comprise a locking mechanism.

Figure 4:
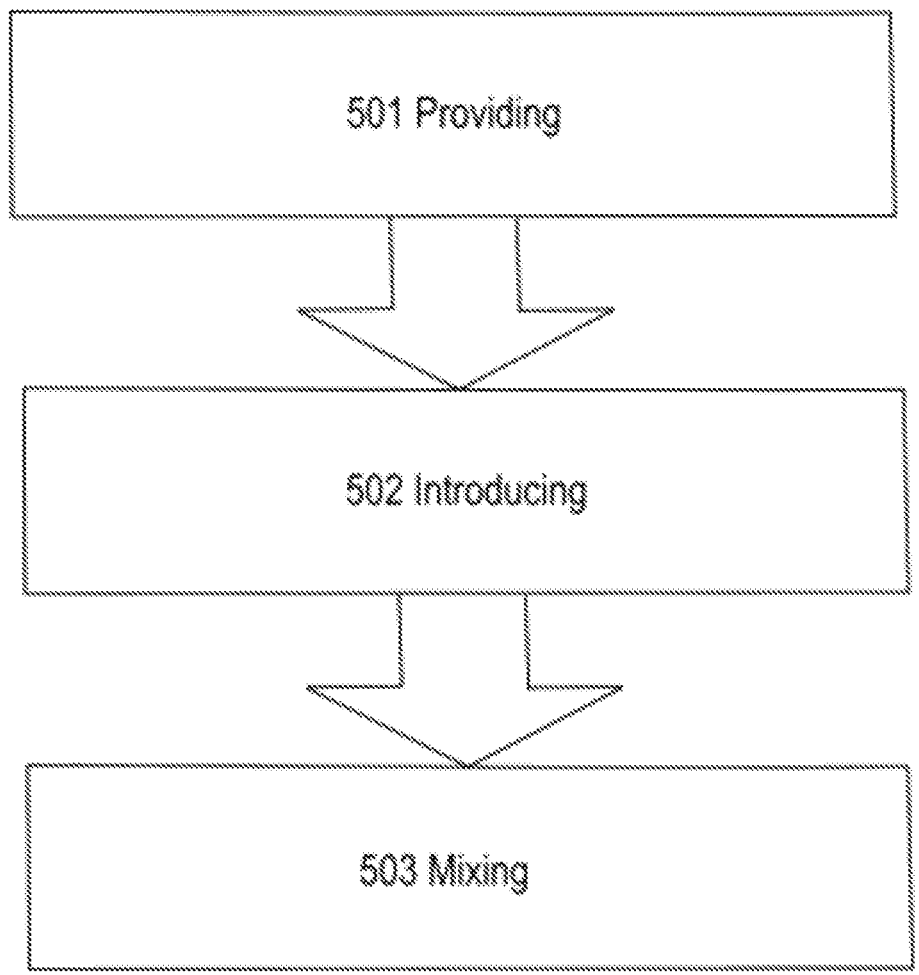
FIG. 4 is a flow diagram illustrating a method of use for the peanut butter mixer, according to an embodiment of the present disclosure.

Referring now to FIG. 4 showing a flow diagram illustrating a method of use 500 for blending peanut butter, according to an embodiment of the present disclosure. In particular, the method of use 500 may include one or more components or features of the peanut butter mixer system 100 as described above. As illustrated, the method of use 500 may include the steps of: step one 501, providing a peanut butter mixer system comprising: a peanut butter mixer assembly including: a container (e.g. the original peanut butter container); a screw-mixer; a motor; and a powerer; and step two 502 introducing the screw mixer into the container; and step three 503 mixing the peanut butter after the screw mixer is inserted into the container.

As described above, the mixer system 100 is preferably designed for remixing natural peanut butter. However, other nut butter products (e.g. cashew butter, almond butter) are known to exhibit the same tendencies to separate out the oils and require remixing. Therefore, the mixer system 100 may be adapted to remix other nut better products in the same fashion as described herein for peanut butter.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A peanut butter mixer system comprising:
   a screw-mixer formed as a continuous rod member having sequential looped coils along a length of said continuous rod member and terminating with a cutting edge, wherein said screw-mixer is powered via a motor and a power source as manipulated by a user-operator to re-mix peanut butter in a provided container;
   wherein said provided container when coupled to said screw-mixer agitates contents within said provided container;
   wherein said sequential looped coils comprises exactly three of said sequential looped coils;
   wherein said sequential looped coils provide rotating and agitation functionality of said screw-mixer so as to be able to whip the peanut butter;
   wherein said cutting edge comprises a filleted arrow tip;
   wherein said screw-mixer comprises a cylindrical profile about a length of said continuous rod member;
   wherein said screw-mixer comprises a terminal V-hook; and
   wherein said screw-mixer comprises engaging and locking mechanism for coupling to a motor.

2. The peanut butter mixer system of claim 1 wherein said provided container is remote to said screw-mixer.

3. The peanut butter mixer system of claim 1 wherein said sequential looped coils provide rotating and agitation functionality of said screw-mixer so as to be able to blend the peanut butter.

4. The peanut butter mixer system of claim 1 wherein said screw-mixer comprises a lower rod portion running parallel to said provided container during use.

* * * * *